United States Patent [19]

Ney et al.

[11] 4,379,948
[45] Apr. 12, 1983

[54] METHOD OF AND ARRANGEMENT FOR DERIVING CHARACTERISTIC VALUES FROM A SOUND SIGNAL

[75] Inventors: Hermann Ney; Michael H. Kuhn, both of Hamburg, Fed. Rep. of Germany

[73] Assignee: U.S. Philips Corporation, New York, N.Y.

[21] Appl. No.: 192,156

[22] Filed: Sep. 29, 1980

[30] Foreign Application Priority Data

Sep. 27, 1979 [DE] Fed. Rep. of Germany ....... 2939077

[51] Int. Cl.³ .............................................. G10L 1/00
[52] U.S. Cl. ................................................. 179/1 SC
[58] Field of Search ................ 179/1 SC, 1 SA, 1 SB, 179/1 SC; 364/554

[56] References Cited

U.S. PATENT DOCUMENTS

| 4,020,286 | 4/1977 | Ceci | 179/1 SC |
| 4,084,245 | 4/1978 | Bunge | 179/1 SB |
| 4,091,237 | 5/1978 | Wolnowski et al. | 179/1 SC |

OTHER PUBLICATIONS

M. Schwartz, "Information, Modulation and Noise," McGraw Hill, 1959, p. 383.

*Primary Examiner*—Emanuel S. Kemeny
*Attorney, Agent, or Firm*—James J. Cannon, Jr.

[57] ABSTRACT

In order to reduce the information contents of a sound signal, for example a speech signal, the sound signal is divided into adjacent frequency ranges and the signals then obtained are consecutively integrated over short time intervals to short-time-spectrum signals. Subsequently, a histogram of the short-time-spectrum signals is formed for each frequency range and said histograms are divided into a given number of equal-area portions. The boundaries of said portions, which are referred to as quantiles, represent the characteristic values. The amplifier noise or the noise of the complete recording arrangement as well as a difference in sound energy level during when different sound signals are processed can then be eliminated at least in respect of their effect.

2 Claims, 5 Drawing Figures

METHOD OF AND ARRANGEMENT FOR DERIVING CHARACTERISTIC VALUES FROM A SOUND SIGNAL

BACKGROUND OF THE INVENTION

1. Field of the Invention

The invention relates to a method for identifying a sound signal which characteristic values are derived from a time-limited portion of said sound signal, specifically a speech signal, the sound signal being divided into adjacent frequency ranges and the sound signal of each frequency range being integrated to short-time-spectrum signals over consecutive equal time intervals. The invention also relates to an arrangement for carrying out the method.

2. Description of the Prior Art

Methods of the aforementioned type serve for identifying or allocating sound signals, which are not identically reproducible, with the aid of the characteristic values. Such sound signals may for example be produced by machines during normal operation or when these machines are tested, in which case a change, which may be indicative of possible failure of the machine is to be detected at the earliest possible stage. Another significant type of sound signals are speech signals by means of which a speaker is to be identified. Such sound signals have the property that they are generally not exactly reproducible and, moreover contain a very large amount of information, so that a direct storage for comparison is impracticable. It is therefore necessary to reduce this amount of information substantially by deriving characteristic values from said signals. Suitably, these characteristic values should only contain that amount of information which is necessary to characterize the relevant sound signal.

It is known to derive consecutive short-time spectra from a sound signal by integration of the energy of the sound signal in adjacent frequency ranges. The long-time spectrum can be derived from said short-time spectrum by forming their sum and, moreover, the standard deviations for the individual frequency ranges can be derived from the long-time spectrum and the short-time spectra. The values of the long-term spectrum or of the standard deviations then represent the characteristic values of the sound signal or the speech signal. However, these known methods frequently result in an excessive reduction of the information content, so that a satisfactory discrimination of similar sound signals or speech signals is not possible.

SUMMARY OF THE INVENTION

It is the object of the invention to provide a method of the type mentioned in the preamble by means of which a sufficient number of characteristic values can be derived from a sound signal or a speech signal, which values constitute a very good representation of the characteristics of the sound signal to be tested or to be compared. According to the invention, this object is achieved in that for each frequency range a histogram of the short-time spectrum signals is formed by counting the number of short-time-spectrum signals of each signal value, that at least a fraction of the number of short-time-spectrum signals of each frequency range is divided by a given quantile number and a quantile value is formed, that the sum of the number of short-time-spectrum signals for consecutive signal values is formed, starting with the smallest signal value, until an integral multiple of the quantile value is reached or is exceeded, and that the signal values at which an integral multiple of the quantile value is reached or exceeded are taken as the characteristic values. These characteristic values are used for identifying the sound signal. Thus the histograms of the consecutive short-time spectra in the individual frequency ranges are used, while instead of a direct storage of the histograms, which would demand too much storage capacity, use is made of characteristic values derived from the histograms. This is effected by forming the quantiles, which constitute the column boundaries if the histogram of the individual frequency ranges are divided into columns of equal area, and which contain sufficient information about the shape of the individual histograms.

When a discontinuous sound signal is processed which is specifically so in the case of a speech signal, pauses may occur in at least the individual frequency ranges, in which pauses the noise of the entire transducer arrangement, including the amplifiers, for converting the sound signal into an electric signal as well as a uniform background noise become perceptible. For example, in the case of white noise this may result in all histograms having high peaks for the signal values corresponding to the noise signal, but these peaks are not characteristic of the sound signal. In order to eliminate the influence of said peaks when determining the quantiles, it is effective that the formation of the sum of the short-time-spectrum signals, starting with the smallest signal vaue, is continued until a minimum signal value is reached at which the number of short-time-spectrum signals is a minimum, that the number of short-time-spectrum signals added until said minimum signal value is reached is subtracted from the total number of short-time-spectrum signals and the quantile value is derived from the difference, and that subsequently the sum-formation of the short-time-spectrum signals recommences from the initial value zero and the comparison with multiples of the quantile value begins. In this way the noise, which becomes apparent in the case of weak sound signals or signal pauses, is largely eliminated.

However, this noise signal is also present during higher sound signal amplitudes and is superimposed in a virtually additive manner. In order to eliminate the influence of the noise at higher sound signal values, it is effective that the minimum signal value is subtracted from those signal values at which an integral multiple of the quantile value is reached or exceeded, the differences representing the characteristic values. Thus, the histograms are shifted in parallel, so that the influence of the additively superimposed noise is substantially eliminated at all sound signal values.

During processing the sound signal may be impaired by the influence of linear transfer functions, for example in the case of a speech signal transmitted via a telephone line by the transfer function of the complete telephone transmission path. In order to eliminate the influence of the transfer function, it is effective that moreover the the long-time spectrum of the sound signal is formed by addition of all short-time-spectrum signals of each frequency range and that the signal values at which an integral multiple of the quantile value is reached or exceeded are divided by a value which is derived from the signal value of the associated frequency range of the long-time-spectrum, the quotients representing the characteristic values. Thus, the difference in sound-energy level of different sound signals occurring during recording can also be eliminated partly. These differences occur in particular in the case of speech signals, for example when the speaking distance from the speaker to the microphone is not constant. The long-time spectrum namely contains the total energy of the sound signal and thus also constitutes an indication of the mean energy of each frequency range.

Like the histograms, the long-time spectrum also contains a noise signal of the transducer arrangement. In order to eliminate the influence of the noise on the long-time spectrum it is effective that first the product of the total number of short-time-spectrum signal values and the minimum signal value of the associated frequency range is subtracted from each spectral value of the long-time spectrum. In this way the noise energy, being present in the long-time spectrum of the sound signal, is removed from this long-time spectrum.

However, if the sound-energy level correction of the quantiles by means of division by the long-time spectrum value of each associated frequency range is effected separately for each frequency range, a small portion of the information will be lost, namely the portion which is contained in the long-time spectrum. In order to avoid this loss of information it is effective that by addition of all the short-time spectrum signals of all frequency ranges a total-energy value is formed and that the signal values at which an integral multiple of the quantile value is reached or exceeded are divided by a value which is the same for all frequency ranges and which is derived from the total-energy value, the quotients representing the characteristic values. The sum of the short-time-spectrum signals of all frequency ranges yields the mean sound energy level independently of the frequency range and provided a satisfactory cancellation of differences in sound energy level, although no longer any compensation for the transfer functions is obtained.

An arrangement for carrying out the method in accordance with the invention by means of a transducer circuit, which receives the electric signal derived from the sound signal and on whose output short-time-spectrum signal values are available, which represent the energy of the electric signals in consecutive equal time intervals for each time one of a plurality of adjacent frequency ranges, is characterized in that there is provided a memory, that during the application of the sound signal the address input of the memory is connected to the output of the transducer circuit and receives the short-time-spectrum signal values and the number of the associated frequency range as addresses, that the data output of the memory is connected to an adder, which increments the content of the addressed memory location by one unit and stores it at the same memory location, that during processing and after the application of the sound signal an address circuit sequentially addresses the memory locations of the memory starting with the lowest addresses, that furthermore a summation circuit is connected to the data output of the memory, which summation circuit forms the sum of the contents of the addressed memory locations of each frequency range, that a comparator circuit compares the sum of the contents with multiples of a quantile value which is derived from the total number of short-time-spectrum signal values of each frequency range and, when a multiple is exceeded, stores the instantaneous address of the address circuit in a result memory connected thereto, said result memory containing, after all memory locations of the memory have been addressed by the address circuit, the signal values representing the desired characteristic values. In this way the characteristic values can be obtained in a comparatively simple manner and used in the subsequent identification of the sound signal.

Further embodiments of this arrangement, in particular for determining the quantile values and for compensating the influence of noise, transfer functions and different sound energy levels, are defined in the further sub-claims.

BRIEF DESCRIPTION OF THE DRAWINGS

The invention will now be described in more detail with reference to the drawing. In the drawing.

DESCRIPTION OF THE PREFERRED EMBODIMENT

Figure 1:
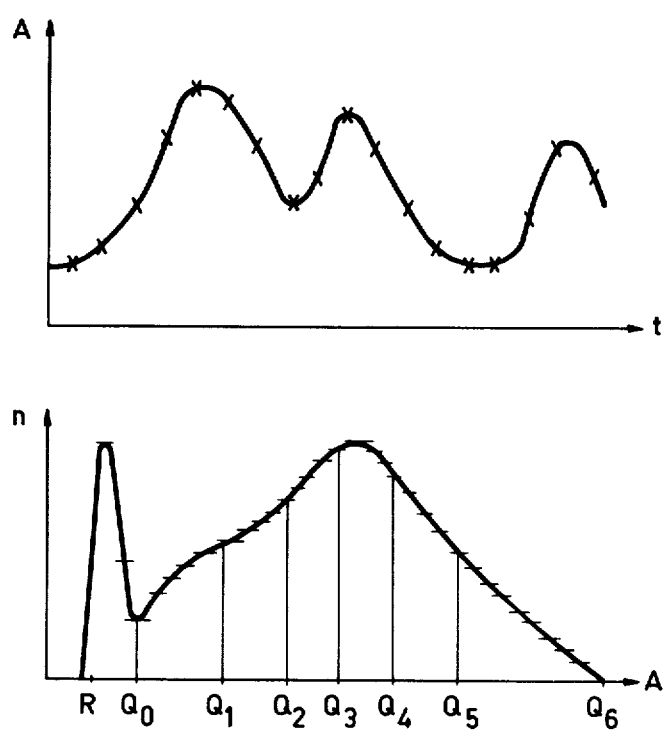
FIG. 1a represents a short-time integrated sound signal in one frequency range as function of time.
FIG. 1b represents a histogram derived therefrom.

FIG. 1a shows an example of the speech signal of a frequency range which is integrated over a short time interval over the time t, a given time interval for example extending from the instant $t_1$ to the instant $t_2$. These integrated signals therefore occur at intervals equal to said time interval and are represented by crosses, which for the sake of clarity are interconnected by a smooth curve. This representation begins with a pause of the sound signal with a minimum value R, which represents the inevitable noise signal of the transducer arrangement with the amplifiers, so that said signal value never becomes smaller than said minimum value. When the sound signal begins, higher values A of the integrated signal are obtained, which upon the next sound-signal pause decrease to the noise value. The short-time integrated sound signals as a function of time in the other frequency ranges vary similarly, though generally they deviate in details.

When it is now counted how frequently each value A occurs in a time-limited sound signal, a representation is obtained which substantially corresponds to that of FIG. 1b. Therein the numbers n, which indicate how many times a specific integrated value A occurs, are specified as a function of A. Since the short-time integrated values A are available in digital form, such a count is readily possible, yielding a sequence of discrete points, which in FIG. 1b for the sake of simplicity are interconnected by a smooth curve.

As already explained with reference to FIG. 1a the smallest value R which occurs depends on the noise of the transducer circuit. Depending on how many pauses or very quiet passages occur in the sound signal or in the signal corresponding to a specific frequency range thereof, the height of the peak of the curve at the value R will differ, and may even be substantially higher than the highest value of the next part of the curve. As the number of short-time integrated values, which solely comprise the noise, contains substantially no information about the sound signal, but considerably influences the position of the quantiles, which will be explained hereinafter, it is effective to eliminate the noise component as far as possible. For this purpose the first minimum of the curve is located, which in the present case is situated at a value $Q_o$, and subsequently further processing continues.

Starting from said value $Q_o$ the curve is now divided into a number of portions of equal surface area. In the selected example there are six portions. The values $Q_o$ to $Q_6$, which represent the boundaries of the individual portions are referred to as quantiles, which in this case represent the desired characteristic values. Said quantiles i.e. the boundaries of the portions, depend strongly on the shape of the curve and consequently contain much information about this shape, while on the other hand they require only small storage capacity, namely for seven values in the present example. The lowest value $Q_o$ may be eliminated, if the curve is shifted so far to the left that said value $Q_o$ is always situated at the origin of the diagram. In this way the influence of the noise is eliminated. The maximum value $Q_6$ is generally equal to the value of A representing the maximum signal value. As the number of digits, constituting a digital representation of the sound signal is limited individual short-time integrated sound signals may reach or even exceed this value. The basic assumption of the highest quantile $Q_6$ being equal to the maximum value that can be represented only results in a negligibly small error, so that only the quantiles $Q_1$ to $Q_5$ need be stored as characteristic values.

The quantiles $Q_1$ to $Q_5$ can be found in that the total number of time intervals and thus the total number of short-time integrated values A are divided by a quantile number, said quantile number representing the number of area portions below the curve in accordance with FIG. 1b. This yields a value which is referred to as quantile value and which represents the number n of all values A which have occurred in an area portion. This is a measure of the area portions and is thus equal for all area portions. Now the numbers n of the individual values A are added to each other starting from the smallest value or minimum at $Q_o$ until the quantile value is reached. The value A at which this quantile value is reached is the first quantile $Q_1$. Then the addition of the numbers n is continued and compared with twice the quantile value etc. Alternatively, when the quantile value is reached for the first time, the addition of the numbers of values A may recommence at zero, until again the quantile value is reached etc., for the following portions.

Figure 2:
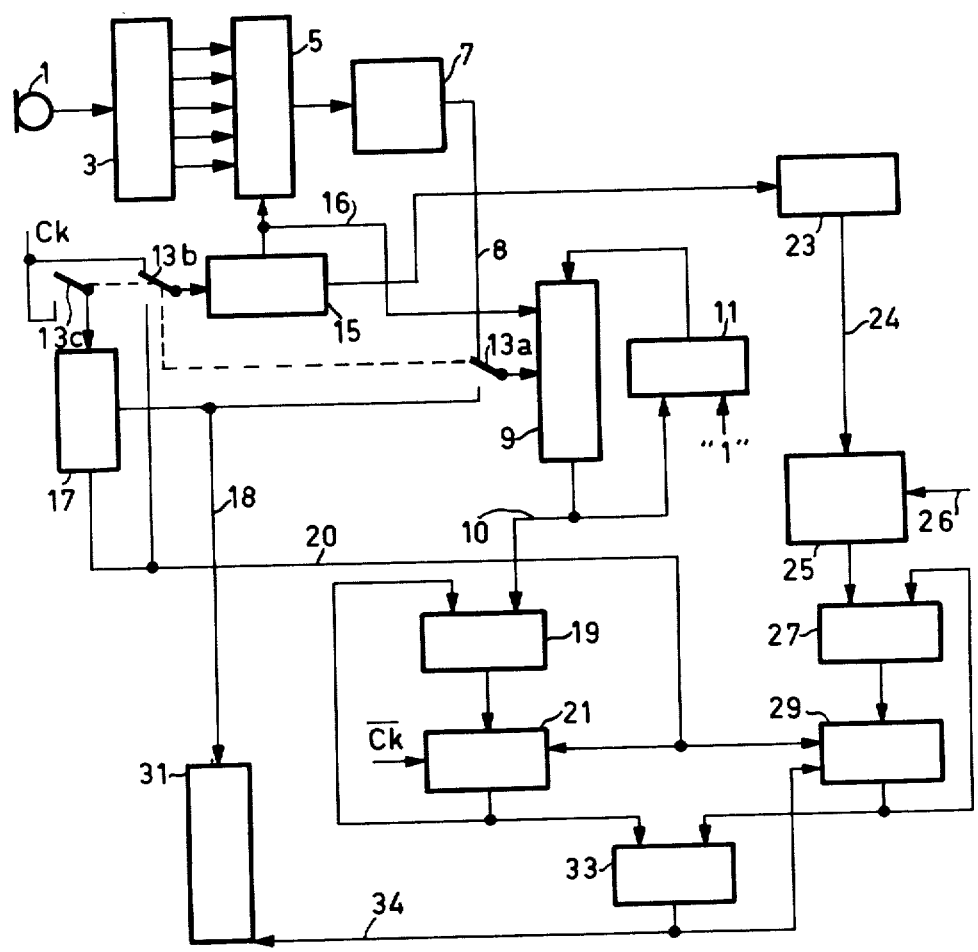
FIG. 2 represents a block diagram of a complete circuit arrangement.

FIG. 2 represents a block diagram of the most important elements for determining the quantiles as characteristic values. Via the microphone 1 the sound signal is received and converted into an electric signal, the amplifiers following said microphone not being shown for the sake of simplicity. The amplified electric signal is then applied to a filter bank 3, which divides said electric signal into a number of adjacent frequency ranges which rectifies the signals obtained for the corresponding frequency ranges and integrates them. The integrated values belonging to the frequency ranges are applied to a multiplexer 5 via separate lines, which multiplexer scans said lines under control of a counter 15 and feeds the scanned signal to an analog-to-digital converter 7. After each scan of a line the relevant signal is again reset to zero and integrated again. The filter bank 3, specifically in the case of a speech signal, may for example divide a frequency range of 100 Hz to 7.500 Hz into 15 adjacent frequency ranges of the same relative bandwidth.

Via the switch 13b the clock input of the counter 15 is connected to a clock signal source, not shown, which supplies a clock signal Ck whose frequency determines the duration of the time intervals over which integration is effected. When the duration of the time intervals is 27 ms the clock frequency should then be 555 Hz.

Via the switch 13a the output 8 of the analog-to-digital converter 7 is connected to some of the address inputs of a memory 9, the other address inputs being connected to the output 16 of the counter 15. The lines 8 and 16, which each transmit multi-bit binary values, in fact comprise a number of parallel lines corresponding to the number of bits, which lines are represented as one line for the sake of simplicity. This also applies to most of the other lines, also in the following Figures, especially when said lines are parallel output of counters, memories and registers. For each of the values that can be produced by the analog-to-digital converter 7, which values comprise for example 8 bits, the memory 9 comprises a number of memory locations corresponding to the number of frequency ranges, each memory location being capable of storing a multi-bit number. By connecting the address inputs of the memory 9 to the outputs of the analog-to-digital converter 7 and the counter 15, which counter indicates the frequency range being scanned, each storage location of the memory 9 corresponds to a specific value in a specific frequency range. The data output of the memory 9 is connected to the data input via an adder 11, the other input of the adder 11 receiving a signal combination corresponding to the value "1". As a result of this its content is incremented by 1 when a memory location is addressed and thus contains the number of times that the corresponding signal value has appeared on the output 8 of the analog-to-digital converter 7 in the relevant frequency range.

The clock input of a number counter 23 is connected to the carry output of the counter 15, which counter 23 produces the total number of time intervals of each frequency range of the sound signal being processed on its parallel output 24.

After the time-limited sound signal has been recorded and the histogram of the short-time spectra has been formed in the memory 9 in the manner described, the switches 13a to 13c, which are suitably formed by electronic switches, for example by means of AND gates, are switched over in parallel to a position opposite the position shown. Thus, the counter 17, which constitutes a part of an address arrangement of the memory 9 for the following processing cycle, receives the clock signal Ck via the switch 13c, which clock signal can simultaneously be switched to a higher frequency. Said counter then starts counting from the zero position and thus addresses consecutive memory locations of the frequency range, which are given by the counter 15, said counter 15 being in the initial position at the beginning of the processing cycle. The contents of the addressed memory locations of the memory 9, which are available on the data output 18, are applied to an input of an adder 19, whose output is connected to the input of a register 21, which receives the inverted clock signal Ck as write signal. The output of the register, apart from being connected to the one input of a comparator 33, is also connected to the other input of the adder 19, so that together with the register 21 it constitutes a known accumulator circuit. Said circuit forms the sum of the number of consecutive short-time integrated signal values which consecutively appear on the data output 10 of the memory 9 and feeds said sum to the input of the comparator 33.

When the sound signal received ceases the signal on the parallel output 24 of the number-counter 23, which counts the total number of time intervals of said sound signal, is applied to a divider 25, which divides said number by a quantile number applied to the divisor input 26, which quantile number represents the number of area portions into which the histogram curves are to be divided. The quantile value supplied by the divider 25 represents the value up to which the memory-location contents available on the data output 10 of the memory 9 should be added in order to attain the boundary of the first area portion and it is applied to the one input of an adder 27, whose output is connected to the input of a register 29, whose output, apart from being connected to the other input of the comparator 33, is also connected to the other input of the adder 27, so that the adder 27 and the register 29 also constitute an accumulator circuit. Initially the register 29 contains the value 0, so that it directly stores the value supplied by the divider 25.

The counter 17 now consecutively addresses the memory locations corresponding to the first frequency range and the summation device comprising the adder 19 and the register 21 forms the sum of the contents of the memory locations, until the value applied to the comparator 33 by the register 21 exceeds or is at least equal to the value supplied by the register 29. In that case the comparator 33 produces a signal on the output line 34, which signal drives the write input of the result memory 31 and stores the signal applied to the output line 18 of the counter 17 of said result memory as the first quantile. At this instant the counter 17 addresses the very memory location which, as is shown in FIG. 1b, corresponds to a value A representing said first quantile. Furthermore, this output signal writes the output signal of the adder 27 into the register 29, which output signal corresponds to the sum of the values available on the outputs of the divider 25 and the register 29, which are both equal to the quantile value, so that the register 29 subsequently contains twice the quantile value and applies this value to the comparator 33.

The counter 17 now consecutively addresses the next memory locations of the memory 9 and the memory-location contents appearing on the data output 10 are further added to each other until on the output of the register 21 a value appears which is greater than or equal to twice the quantile value, so that the comparator 33 again produces an output signal on the line 34, which writes the next quantile into the result memory 31 and in the adder again adds the quantile value to the contents of the register 29 and writes this into said register, so that said register now contains three times the quantile value, which process is continued until the counter 17 has addressed all memory locations of a frequency range. The counter 17 then produces a carry signal on the line 20, which via the switch 13b, which is now in a position opposite the position shown, reaches the clock input of the frequency-range counter 15 and sets this counter to the next frequency range. Furthermore, the carry signal is applied to the next input of the registers 21 and 29 via the line 20 and sets these registers to zero, after which subsequently the simple quantile value supplied by the divider is written into the register 29 via the adder 27.

After the counter 17 has supplied the carry signal, it begins to count again from its initial position and thus again addresses consecutive memory locations in the memory 9, but now at memory locations corresponding to the second frequency range of the filter bank 3. The contents of the memory locations now appearing on the data output 10 of the memory 9 are again written into the summation device comprising the adder 19 and the register 21 and the result is compared in the comparator 33 with the quantile value in register 29, in the same way as for the contents of the memory locations of the first frequency range in the memory 9, so that consecutively the quantiles of the second frequency range are written into the result memory 31 which process is also repeated for the next frequency ranges. The result memory 31 finally contains the quantiles of the histograms of all frequency ranges and these can be read out and buffered in another memory in order to compare them with the quantiles of another similarly processed sound signal, so as to ascertain the extent to which the two sound signals correspond. In the case of speech recognition it is then for example possible to ascertain whether the second speech signal stems from the same speaker as the first speech signal.

Figure 3:
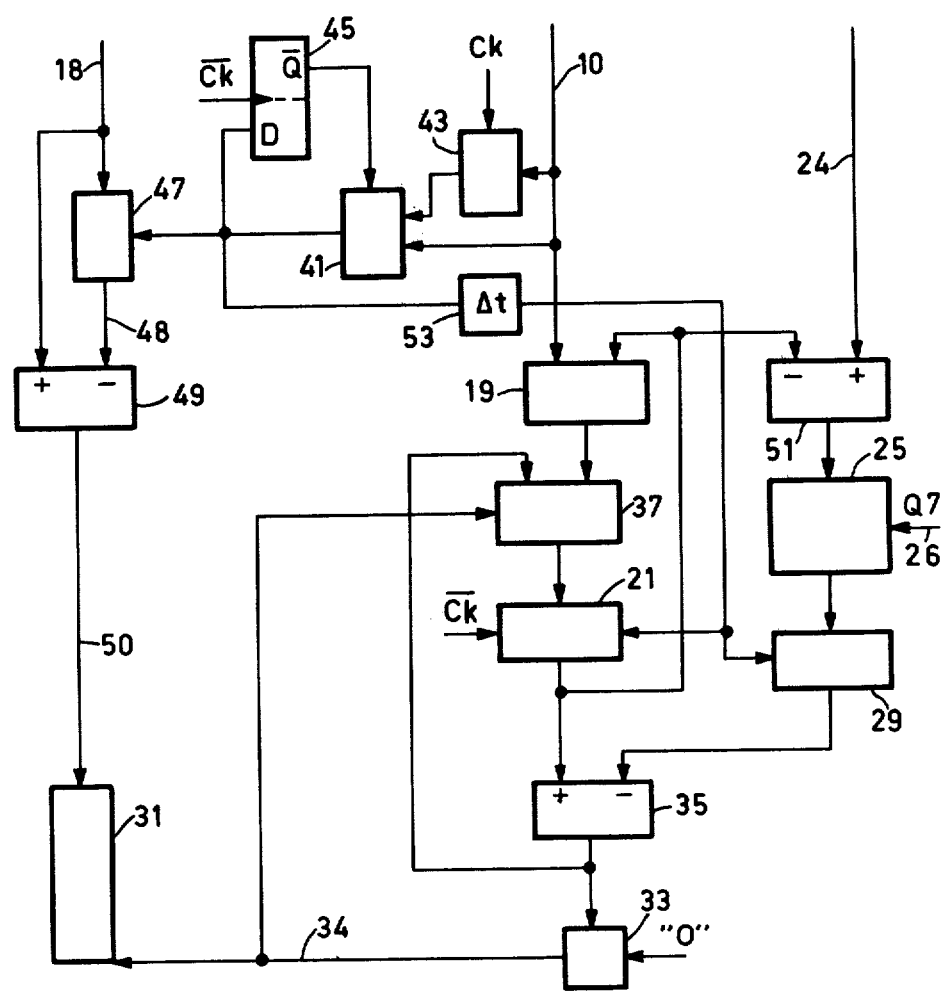
FIG. 3 is a block diagram of an extension of a part of the arrangement, of FIG. 2, said part accounting for the elimination of the influence of noise.

FIG. 3 represents a part of the circuit arrangement of FIG. 2, namely that for processing the histograms derived from the sound signal, starting from the data output 10 of the memory 9 as well as the output 24 of the number counter 23 and the output 18 of the address counter 17, in a modification in which the influence of the noise is eliminated, specifically in pauses of the sound signal. In FIG. 3, elements which correspond to those of FIG. 2 bear the same reference numerals.

The one input of a comparator 41 is connected to the data line 10, the other input of said comparator being connected to the data line 10 via a register 43. As write signal the register 43 receives the same clock signal Ck as the counter 17 in FIG. 2, which addresses the memory 9, so that except for a change in addresss the register 43 always contains the value appearing on the data line 10 in the previous clock period. In this way the comparator 41 each time compares two consecutive values or numbers of the histogram just processed and supplies a signal if the value on the data line 10 is greater than the value supplied by the register 43, because then the minimum of the curve at the quantile $Q_o$ in FIG. 1 is reached. Therefore, the comparator 41 will be referred to as minimum comparator. Its output signal drives the write input of a register 47 and writes the value corresponding to the quantile $Q_o$, which is available on the address line 18 of the counter 17 in FIG. 2, into the register 47. Moreover, said output signal is applied to the D-input of a D flip-flop 45, which flip-flop receives the inverse clock signal Ck on the clock input and thus changes over after a half a clock period, thereby inhibiting further comparison by the comparator 41 and terminating the output signal. Furthermore, the output signal is applied to the reset input of the register 21 and the write input of the register 29 via a time delay stage 53. When the output signal of the minimum-comparator 41 begins, the summation circuit comprising the adder 19, the register 21 as well as the multiplexer 37, to be described hereinafter, has formed the sum of the numbers of short-time integrated values up to the quantile $Q_o$ in FIG. 1, which quantile is mainly caused by noise. This added number on the output of the register 21, apart from being applied to the one input of the adder 19, is now also applied to the minuend input of a subtractor 51, whose subtrahend input is connected to the line 24, on which the output signal of the number counter 23, which corresponds to the total number of time intervals of the sound signal or short-time integrated values is available. As a result of this, the divider 25 at its dividend input receives a number which is decremented by the number of time intervals containing noise only, which is further divided by the quantile number applied to the input 26, and which is subsequently applied to the register 29. The delayed signal on the output of the time delay circuit 53, then writes the first quantile value into the register 29. Moreover, the register 21 is reset, so that the formation of the sume of the values on the data line 10 recommences at zero.

The output of the register 21 is connected to the subtrahend input and the output of the register 29 to the minuend input of a subtractor 35, which then subsequently supplies a negative output signal.

The summation circuit comprising the adder 19, the multiplexer 37 and the register 21 now again forms the sum of the values which consecutively appear on the data line 10, starting with the value that follows the minimum value. If said minimum value should also be included, the one input of the adder 19 may be connected to the output of the register 43 instead of directly to the data line 10. As soon as the value on the output of the register 21 now attains or exceeds the quantile value on the output of the register 29, the subtractor 35 produces a positive value on the output. This output is connected to the comparator 33, which in this case compares said value with the value "0" and when it is reached or exceeded produces a signal on the output line 34. This signal controls the multiplexer 37 and connects the input of the register 21 to the output of the subtractor, so that the output value of said subtractor is written into the register 21 upon the next inverse clock signal Ck. Thus, in contradistinction to the arrangement of FIG. 2, no comparison with consecutive multiples of the quantile value is effected, but each time that the quantile value is reached or exceeded it is subtracted from the sum value. This fully corresponds to the comparison with consecutive multiples of the quantile value.

The signal on the output line 34 of the comparator 33 moreover controls the write input of result memory 31 in the same way as in FIG. 2. The data input of said result memory now does not directly via the line 50 receive the address appearing on the memory 9 in FIG. 2 from the output of the counter 17 via the line 18, but this line is connected to the subtrahend input of subtractor 49, whose minuend input receives the input signal of the register 47 via the line 48, which register contains the minimum value. Said minimum value is now continually subtracted from the address on the line 18 and applied to the result memory 31, which in FIG. 1b corresponds to a shift of the complete histogram by the noise component.

After the short-time integrated values of the first frequency range have been processed, in the same way as described with reference to FIG. 2, the next frequency range is selected, the carry signal on line 20 in FIG. 2, apart from the registers 21 and 29, also resetting the register 47 and the D-flip-flop 45, which for the sake of simplicity is not shown in FIG. 3.

In the circuit arrangements described so far no allowance has been made for the influence of different transfer functions when processing various sound signals to be compared with each other. Owing to a frequency-dependent transfer function the energies in the individual frequency ranges are individually raised or reduced and in a histogram this manifests itself as a proportional shift of the abscissa values or a change in scale by a constant scaling factor. A special case of this are differences in sound energy level during recording, these differences being independent of frequency. As a result of this, all histograms are shifted proportionally with the same scale. Thus, both the transfer function and the sound energy level directly influence the quantiles.

The simplest method of compensating for differences in sound energy level is a dynamic control of the sound signal which has been converted into an electric signal. However, in most cases such a dynamic control affects the sound signal, because naturally subsequent high sound energy levels cannot yet be allowed for at the beginning, so that the beginning of the sound signal will be recorded too loud in comparison with the rest or in comparison with the mean value. Therefore, for a correct sound energy level compensation the complete sound signal should be recorded and from this for example a signal which corresponds to the mean of the maximum sound energy level should be derived. The long-time spectrum is particularly suitable for this purpose, which spectrum represents the total energy of the sound signal in the individual frequency ranges and can for example be obtained by forming the sum of the short-time-spectrum signals of the frequency range. By forming the sum of the individual values of the long-time spectrum a value is then obtained which represents the sound-energy level during recording and, by a proportional shift of the abscissa values of the histograms of all frequency ranges in accordance with said sum value, the influence of different sound energy levels is compensated for, i.e. all quantiles should be divided by this sum value.

For the compensation of a frequency-dependent transfer function, however, the abscissa values of the histograms for the individual frequency ranges should be shifted separately. For this purpose the values of the long-time spectrum for the individual frequency ranges should be processed separately, i.e. the quantiles of each frequency range should be divided by the value of the long-time spectrum in the same frequency range.

Figure 4:
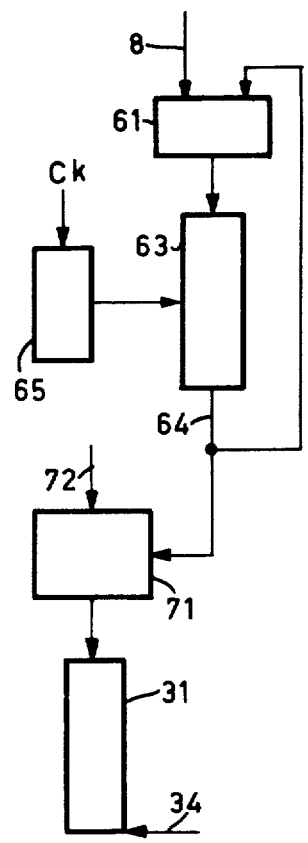
FIG. 4 is a block diagram of an extension of a part of the arrangement of FIGS. 2 and 3, said part accounting for the elimination of the influence of differences in sound energy level.

FIG. 4 represents the block diagram of a circuit arrangement employed for this purpose. The signal which is produced on the output line 8 by the analogu-to-digital converter 7 of FIG. 2 is moreover applied to an input of an adder 61, whose output is connected to the input of a memory 63 and whose other input is connected to the output 64 of said memory. For each frequency range, the memory 63 comprises a memory location, which is capable of storing a multi-bit number. The memory 63 is driven by a counter 65, which receives the clock signal Ck on the clock input and which has memory space corresponding to the number of frequency ranges or outputs of the filter bank 3 in FIG. 2. Said counter 65 may be replaced by the counter 15 in FIG. 2, so that the address input of the memory 63 should also be connected to the line 16.

Via the connection of the output 64 each value applied via the line 8 is added to the content of the memory location just addressed. As a result of this when recording of the sound signal is completed the memory 63 contains the individual values of the long-time spectrum of this sound signal.

During subsequent processing of the histograms of the recorded sound signal in the arrangement of FIG. 2 or FIG. 3, that memory location of the frequency range in the memory 63 is addressed, whose histogram is just being processed, which when the counter 15 in FIG. 2 is used for addressing the counter 63 is effected automatically. The value appearing on the output 64 of the memory 63 is applied to the divisor input of a divider 71, whose dividend input 72 is connected to the output 18 of the counter 17 or, if the arrangement of FIG. 3 is employed, is connected to the output 50 of the subtractor 49. The output of the divider 71 is connected to the data input of the result memory 31, so that the divider 71 in the arrangement of FIG. 2 is to be included in the line 18 and in the arrangement of FIG. 3 in the line 50. In this way all quantiles of a frequency range, while being generated, are reduced proportionally by a value corresponding to the total energy in said frequency range, so that the influence of differences in sound energy level is fully compensated for.

The signals applied to the adder 61 via the line 8 also contain the component as a result of noise, which is then also contained in the long-time spectrum. When the arrangement of FIG. 3 is employed, this noise component is removed from the histogram. In order to obtain exact values, the noise component should also be removed from the long-time spectrum when said arrangement is employed.

Figure 5:
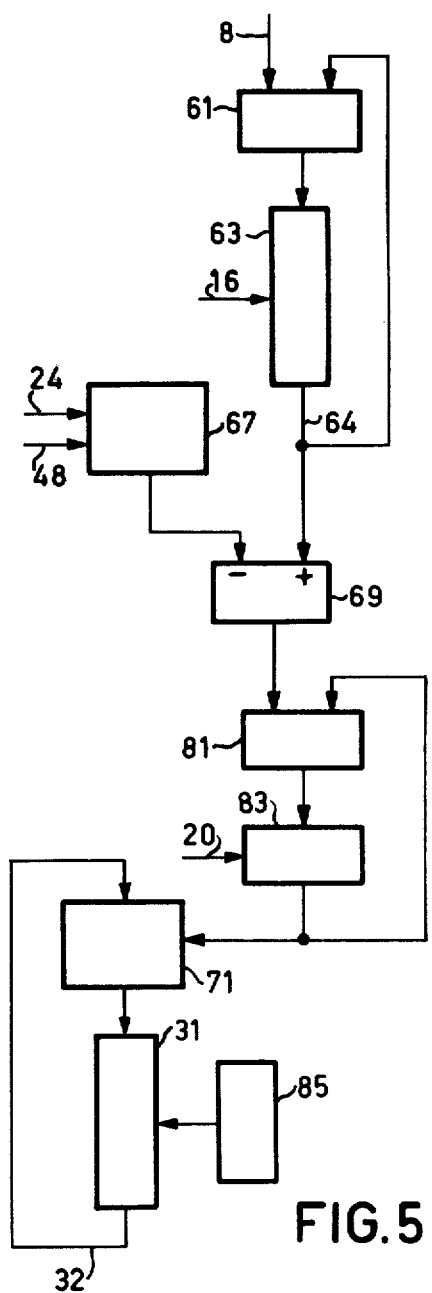
FIG. 5 is a block diagram of the extension of the arrangement of FIG. 4.

This is effected by means of the circuit whose block diagram is shown in FIG. 5. The adder 61 and the memory 63 are then arranged or connected in the same way as in FIG. 4 and they also operate in the same manner as described with reference to FIG. 4. However, the address input of the memory 63 is now connected to the output line 16 of the counter 15 in FIG. 2.

The output 64 of the memory 63 is now connected to the subtrahend input of a subtractor 69, whose minuend input is connected to the output of a multiplier 67. Said multiplier multiplies the total number of time intervals of the recorded sound signal, which number is available on the output 24 of the number counter 22 in FIG. 2, by the output signal of the register 47 on the line 48, which represents the amplitude of the noise signal in the relevant frequency range. Consequently, this product is the energy to be attributed to noise during the entire sound signal, which in the subtractor 69 is subtracted from the total energy, the difference being available on output 70. In the same way as in FIG. 4 this output 70 can now be connected directly to the divisor input of the divider 71.

In FIG. 5 the output 70 of subtractor 69 is connected to the one input of an adder 81, whose output is connected to the input of the register 83 and whose second input is connected to the output of said register. The register 83 receives the carry signal from the counter 17 in FIG. 2 on the line 20 as the write signal, so that this register 83 contains the sum of the individual corrected values of the long-time spectrum when the processing of the histograms of all frequency ranges is completed. As stated previously, this value is a measure of the sound energy level, so that by means of this part of the arrangement of FIG. 5 the influence of differences in sound energy level is compensated for. However, since this value is not available until all histograms have been processed, the quantiles of said histograms cannot yet be corrected when they are generated, and therefore they are temporarily stored in uncorrected form in the result memory 31. It is not until after the quantiles of all histograms have been generated that an address counter 85 is started, which consecutively addresses the memory locations of the result memory 31, and the quantiles which consecutively appear on the output 32 are applied to the divider 71 and divided by the sum of the corrected long-time spectrum and are subsequently rewritten into the same memory location in the result memory 31. The result memory 31 does not contain the corrected quantiles until the counter 85 has addressed all the memory locations of said memory.

Since the values of the long-time spectrum and specifically the sum of these values of the long-time spectrum are very high numbers, it is effective to divide them by a scaling factor before they are further processed in the divider 71. This may simply be effected by a constant shift of the decimal point, which can be achieved by an appropriate design of connection of the divider 71.

The elements in the arrangements, such as memories registers and computing elements may be designed in various known manners. For example, the memories may be combined to a single memory of corresponding capacity and the computing elements may also be combined through sharing. Specifically, said elements as well as the registers and comparators may be replaced completely or at least partly by a fixed-program microprocessor.

What is claimed is:

1. An arrangement for deriving characteristic values from a sound signal having a transducer circuit, which circuit receives the electrical signal derived from the sound signal and on whose output short-time-spectrum signal values are available, which values represent the energy of the electrical signal in consecutive equal time intervals for each of a plurality of adjacent frequency ranges, comprising:

a memory (9) having an address input;
a clock supplying a clock signal;
multiple parallel switch means (13) to connect said address input of said memory to the output (8) of said transducer circuit (3, 5, 7) under the control of said clock signal; said multiple parallel switching means being a series of switches connected in parallel, one of which connects said memory address input to said transducer circuit output when a sound signal is present on said output to receive said short-time-spectrum signal values and the number of the associated frequency ranges as addresses;
an address circuit (15, 17) which consecutively addresses the memory location (19, 21) of said memory under the control of said clock signal via said switching means;
a data output (10) for said memory;
a data output of said memory (10) connected to said address circuit;
said address circuit forming some of the contents of said addressed memory locations of each frequency range;
an adder (11) connected to said data output of said memory such that said adder increments the content of each addressed memory location by one unit and stores the result at said location, thus storing the number of times that the corresponding signal has appeared on said transducer output;
a result memory (31);
a comparator circuit (33, 35) to compare the sum of the contents of said addressed memory locations with multiples of a quantile value which is derived from the total number of short-time-spectrum signal values of each frequency range and, when a multiple is exceeded to store the instantaneous address of the address circit (15, 17) in said result memory connected thereto;

said result memory containing the signal values representing the desired characteristic values after all memory locations of said memory (9) have been addressed by the address circuit.

2. An arrangement as claimed in claim 1, further comprising:

a number counter (23) whose clock input during each of the consecutive time intervals receives a clock signal from a device (15) which drives the transducer circuit (3, 5, 7);

an output (24) of said number counter;

a divider (25), connected to said output of said number counter, which divider receives a signal corresponding to the maximum number of multiples of the quantile value and its divisor input (26).

* * * * *